United States Patent
Li Puma et al.

(10) Patent No.: US 9,419,657 B1
(45) Date of Patent: Aug. 16, 2016

(54) HYBRID I/Q AND POLAR TRANSMITTER (71) Applicant: Intel IP Corporation, Santa Clara, CA (US)

(72) Inventors: Giuseppe Li Puma, Bochum (DE); Victor Da Fonte Dias, Neubiberg (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/861,005

(22) Filed: Sep. 22, 2015

(51) Int. Cl.
*H04L 27/00* (2006.01)
*H04B 1/04* (2006.01)
*H04L 27/20* (2006.01)
*H03M 1/74* (2006.01)

(52) U.S. Cl.
CPC . *H04B 1/04* (2013.01); *H03M 1/74* (2013.01); *H04L 27/2032* (2013.01)

(58) Field of Classification Search
CPC ............. H04B 1/0483; H04B 2001/0491; H04B 1/0003; H04B 2201/70716; H04B 1/04; H03C 2200/0058; H04L 27/20; H04L 27/3488; H04L 27/364; H04L 27/183; H04L 27/36; H04L 27/2032; H03M 1/66; H03M 1/007; H03M 1/74; H03M 1/0639; H03M 1/201; H03M 1/20; H03M 3/412
USPC ................... 375/295, 260; 341/144
See application file for complete search history.

(56) References Cited

U.S. PATENT DOCUMENTS 6,259,747 B1 * 7/2001 Gustafsson ......... H04L 27/2071
332/103

OTHER PUBLICATIONS

Zimmermann, Niklas. "Design and Implementation of a Broadband RF-DAC Transmitter for Wireless Communications." Jul. 1, 2011. 151 pages.
Nash, Eamon. "Correcting Imperfections in IQ Modulators to Improve RF Signal Fidelity." Analog Devices, AN-1039 Application Note. www.analog.com. 8 pages.
Bercher, J.-F., et al. "Adaptive delays alignment in polar transmitter architecture." 9 pages.
"Sources of Error in IQ Based RF Signal Generation." Jan. 9, 2007. www.ni.com. 8 pages.
U.S. Appl. No. 15/071,867, filed Mar. 16, 2016.
Non Final Office Action Dated Jun. 16, 2016 U.S. Appl. No. 15/071,867.

* cited by examiner

*Primary Examiner* — Rahel Guarino
(74) *Attorney, Agent, or Firm* — Eschweiler & Associates, LLC (57) ABSTRACT

A hybrid polar I-Q transmitter includes an I-Q derivation circuit configured to receive a first and second I-Q data components comprising a first I-Q data pair, and generate a first and second I-Q derived data components comprising a second I-Q data pair, respectively, based thereon, by utilizing a resolution information of a digital-to-analog converter (DAC) and a design criteria. The I-Q derivation circuit is further configured to determine a residual angle corresponding to a phase angle difference between the first I-Q data pair and the second I-Q data pair. The hybrid polar I-Q transmitter further comprises a modulation circuit configured to compensate the determined residual angle corresponding to the phase angle difference between the first I-Q data pair and the second I-Q data pair.

22 Claims, 5 Drawing Sheets

HYBRID I/Q AND POLAR TRANSMITTER

FIELD

The present disclosure relates to I-Q transmitters and, in particular to an apparatus and a method for reducing a resolution of digital to analog converters (DAC) in I-Q transmitters.

BACKGROUND

Since new applications and upcoming standards require increasing data rates and lower power consumption, the study and development of new architectures of communication transmitters for user units is very active. The in-phase and quadrature modulator (IQ modulator) is a key component in modern wireless transmitters. I-Q up conversion is one of the architecture of choice for implementing transmitter signal chains for end applications such as cellular, WiMAX, and wireless point-to-point. It provides a convenient method for modulating data bits or symbols onto an RF carrier.

In a typical wireless transmitter that uses I-Q modulation, an input data comprises an in-phase component and a quadrature component. The I-Q transmitter comprises a DAC, for example an RFDAC that convert the in-phase and the quadrature components to a pair of I and Q output signals. RFDACs directly convert a digital baseband signal into an RF output signal, by using a building block which combines digital-to-analog conversion and up conversion mixing. High-performance digital-to-analog converters with high resolution can provide the flexibility needed to support multiple frequency bands and multiple standards in modern wireless communication transmitters. For cellular applications such as WCDMA or LTE, the required resolution of DACs is typically in the range of 15 bits. However, the high resolution DACs leads to higher power dissipation.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

In one embodiment of the disclosure, a hybrid polar I-Q transmitter comprises an I-Q derivation circuit configured to receive a first and second I-Q data components comprising a first I-Q data pair, generate a first and second I-Q derived data components comprising a second I-Q data pair, respectively, based thereon, by utilizing a resolution information of a digital-to-analog converter (DAC) and a design criteria. The I-Q derivation circuit is further configured to determine a residual angle corresponding to a phase angle difference between the first I-Q pair and the second I-Q pair. Each I-Q data pair corresponds to a point in an I-Q constellation diagram and the first I-Q data pair defines a first phasor having a first radius and a first phase angle associated therewith and the second I-Q data pair defines a second phasor having a second radius and a second phase angle associated therewith. The hybrid polar I-Q transmitter further comprises a modulation circuit configured to compensate the determined residual angle corresponding to the phase angle difference between the first I-Q pair and the second I-Q pair in the I-Q derivation circuit.

In another embodiment of the disclosure, a hybrid polar I-Q transmitter comprises a co-ordinate transformation circuit configured to receive a first and second I-Q data component comprising a first I-Q data pair and generate a first and second I-Q derived data components comprising a second I-Q data pair, respectively, based thereon. Each I-Q data pair corresponds to a point in an I-Q constellation diagram and generating the first and second I-Q derived data components comprises choosing a point corresponding to the second I-Q pair from a predefined set of points in the I-Q constellation diagram based on a design criteria. The first I-Q data pair defines a first phasor having a first radius and a first phase angle associated therewith and the second I-Q data pair defines a second phasor having a second radius and a second phase angle associated therewith. The hybrid polar I-Q transmitter further comprises a residual angle computation circuit configured to determine a phase angle difference between the first phasor and the second phasor and a synthesizer circuit configured to generate a phase compensated local oscillator (LO) signal comprising an LO signal with a correction phase added thereto, wherein the correction phase corresponds to the determined phase angle difference in the residual angle computation circuit.

In another embodiment of the disclosure, a method for a hybrid polar I-Q transmitter comprises receiving first and second I-Q data components comprising a first I-Q data pair and generating a first and second I-Q derived data components comprising a second I-Q data pair, respectively, based thereon, using a co-ordinate transformation circuit. Each I-Q data pair corresponds to a point in an I-Q constellation diagram and the first I-Q data pair defines a first phasor having a first radius and a first phase angle associated therewith, and the second I-Q data pair defines a second phasor having a second radius and a second phase angle associated therewith. The method further comprises determining a phase angle difference between the first phasor and the second phasor using a residual angle computation circuit and generating a phase compensated local oscillator (LO) signal comprising an LO signal with a correction phase added thereto using a synthesizer circuit, wherein the correction phase corresponds to the determined phase angle difference in the residual angle computation circuit. In addition, the method comprises up-converting a processed first and second I-Q derived data components using a mixer circuit based on the phase compensated LO signal.

The present disclosure will now be described with reference to the attached drawing figures, wherein like reference numerals are used to refer to like elements throughout, and wherein the illustrated structures and devices are not necessarily drawn to scale. As utilized herein, terms "module", "component," "system," "circuit," "element," "slice," and the like are intended to refer to a computer-related entity, hardware, software (e.g., in execution), and/or firmware. For example, a circuit or similar term can be a processor, a process running on a processor, a controller, an object, an executable program, a storage device, and/or a computer with a processing device. By way of illustration, an application running on a server and the server can also be a circuit. One or more circuits can reside within a process, and a circuit can be localized on one computer and/or distributed between two or more computers. A set of elements or a set of other circuits can be described herein, in which the term "set" can be interpreted as "one or more."

As another example, a circuit or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a circuit can be an apparatus that provides specific functionality through electronic components without mechanical parts; the electronic components can include one or more processors therein to execute software and/or firmware that confer(s), at least in part, the functionality of the electronic components.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

In the following description, a plurality of details is set forth to provide a more thorough explanation of the embodiments of the present disclosure. However, it will be apparent to one skilled in the art that embodiments of the present disclosure may be practiced without these specific details. In other instances, well-known structures and devices are shown in block diagram form rather than in detail in order to avoid obscuring embodiments of the present disclosure. In addition, features of the different embodiments described hereinafter may be combined with each other, unless specifically noted otherwise.

As indicated above, high-performance digital-to-analog converters with high resolution can provide the flexibility needed to support multiple frequency bands and multiple standards in modern wireless communication transmitters. In a typical I-Q transmitter, a single data signal is split into an in-phase component I and a quadrature component Q. The in-phase component I and a quadrature component Q have an infinitesimal resolution which in practice can be accomplished by increasing a word length of the signal. In conventional I-Q transmitters, in order to support high word lengths, high resolution DACs are required. DACs have quantization error associated therewith which can be modelled as a quantization noise. The quantization noise greatly reduces with an increase in DAC resolution. High resolution DACs, however, consume higher power and also have increased area requirements. In this disclosure, an architecture and a method to reduce DAC resolution in I-Q transmitters is proposed. In particular, an architecture of a hybrid polar I-Q transmitter that supports high data rates and lower noise floor using a lower resolution DAC is presented.

In the following description, examples will be described and explained in more detail with respect to reducing DAC resolution in I-Q transmitters. In particular, in one embodiment, a hybrid polar I-Q transmitter that reduces DAC resolution is described.

Figure 1:
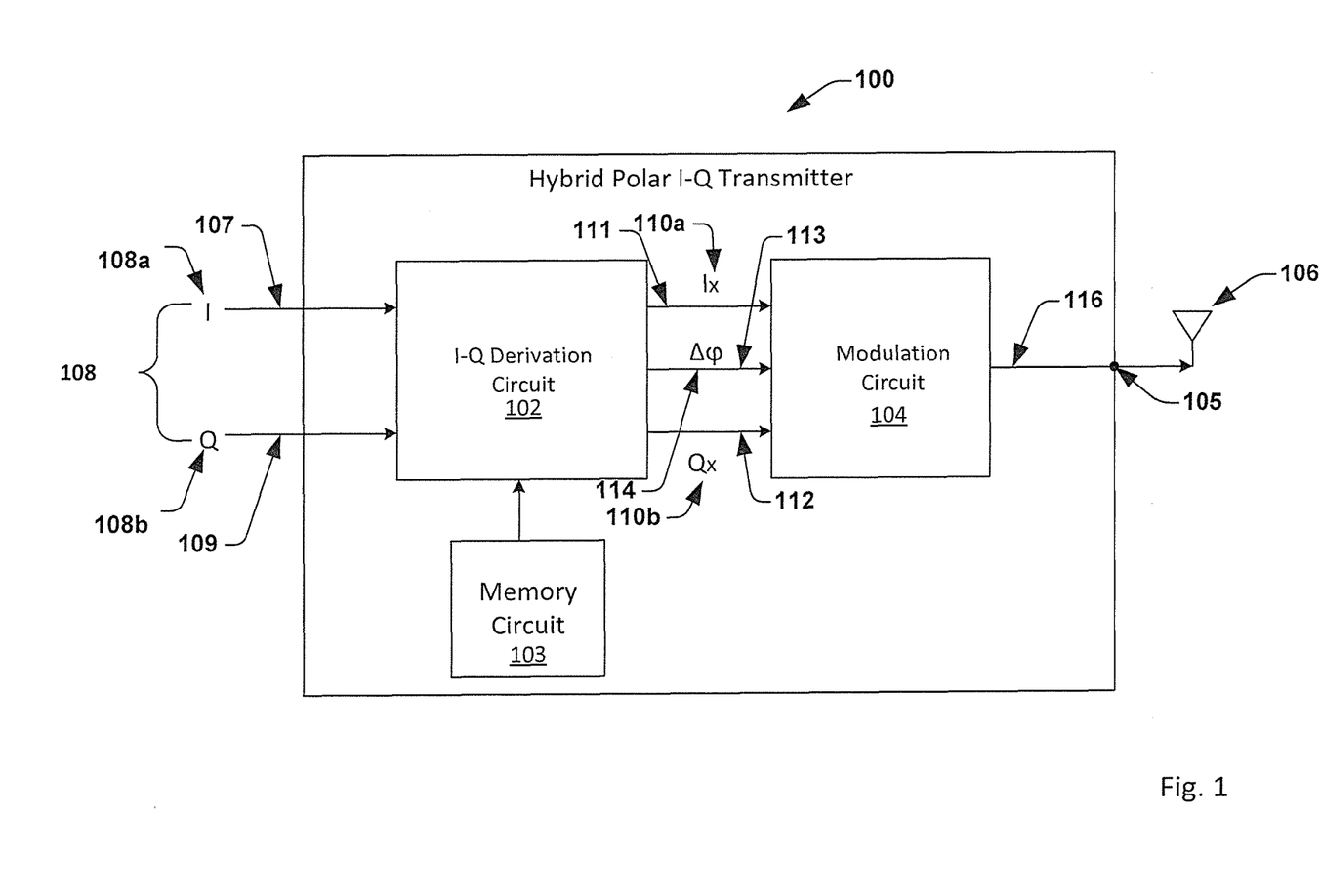
FIG. 1 depicts a simplified block diagram of a hybrid polar I-Q transmitter 100, according to one embodiment of the disclosure.

FIG. 1 depicts a simplified block diagram of a hybrid polar I-Q transmitter 100, according to one embodiment of the disclosure. In some embodiments, the hybrid polar I-Q transmitter 100 is included in the transmit path of a transceiver in wireless communication systems. The hybrid polar I-Q transmitter 100 comprises an I-Q derivation circuit 102, a modulation circuit 104 and an antenna port 105. In some embodiments, the modulation circuit 104 can be a part of radio frequency (RF) front end of the hybrid polar I-Q transmitter 100. The I-Q derivation circuit 102 is configured to receive a first I-Q data component I 108a at a first input 107 and a second I-Q data component Q 108b at a second input 109 and generate a first I-Q derived data component Ix 110a and a second I-Q derived data component Qx 110b. In some embodiments, the first I-Q derived data component Ix 110a and the second I-Q derived data component Qx 110b are generated based on information of a resolution of a digital to analog converter (DAC) in a signal path of the first and the second I-Q derived data components and a design criteria. Further, the hybrid polar I-Q transmitter 100 comprises a memory circuit 103 coupled to the I-Q derivation circuit 102 configured to store the instructions to implement the design criteria. In some embodiments, the first and second I-Q data components I 108a and Q 108b comprise a first I-Q data pair (I,Q), and the first and second I-Q derived data components Ix 110a and Qx 110b, comprise a second I-Q data pair $(I_x,Q_x)$. In some embodiments, each of the first and the second I-Q data pairs corresponds to a point respectively, in an I-Q constellation diagram and the first I-Q data pair (I,Q) defines a first phasor having a first radius and a first phase angle associated therewith, and the second I-Q data pair $(I_x,Q_x)$ defines a second phasor having a second radius and a second phase angle associated therewith. The I-Q derivation circuit 102 is further configured to determine a residual angle $\Delta\phi$ 114 corresponding to a phase angle difference between the first I-Q data pair (I,Q) and the second I-Q data pair $(I_x,Q_x)$.

The hybrid polar I-Q transmitter 100 further comprises a first signal path 111, a second signal path 112 and a residual angle path 113 configured to convey the first I-Q derived data component Ix 110a, the second I-Q derived data component Qx 110b and the residual angle $\Delta\phi$ 114 respectively to the modulation circuit 104. In some embodiments, the hybrid polar I-Q transmitter 100 comprises a time delay control circuit (not shown) configured to maintain precision timing alignment between signals in the residual angle path 113 and the first and the second signal paths 111 and 112 respectively. The modulation circuit 104 is located downstream of the I-Q derivation circuit and is configured to up convert the first I-Q derived data component Ix 110a and the second I-Q derived data component Qx 110b based on phase compensated local oscillator signals and convey it to an antenna 106 via the antenna port 105. In some embodiments, the modulation circuit 104 comprises a synthesizer circuit (not shown) configured to generate the phase compensated LO signals in order to compensate the first I-Q derived data component Ix 110a and the second I-Q derived data component Qx 110b, using the determined phase angle difference, for example, the residual angle Δϕ 114 in the I-Q derivation circuit 102, thereby generating the compensated output signal 116. In some embodiments, the compensated output signal 116 is at RF frequency.

In some embodiments, the modulation circuit 104 comprises a DAC, the resolution information of which is used in generating the first I-Q derived data component Ix 110a and the second I-Q derived data component Qx 110b in the I-Q derivation circuit. Further, in some embodiments, the modulation circuit 104 comprises a mixer configured to up convert the first I-Q derived data component Ix 110a and the second I-Q derived data component Qx 110b to RF frequency.

Figure 2:
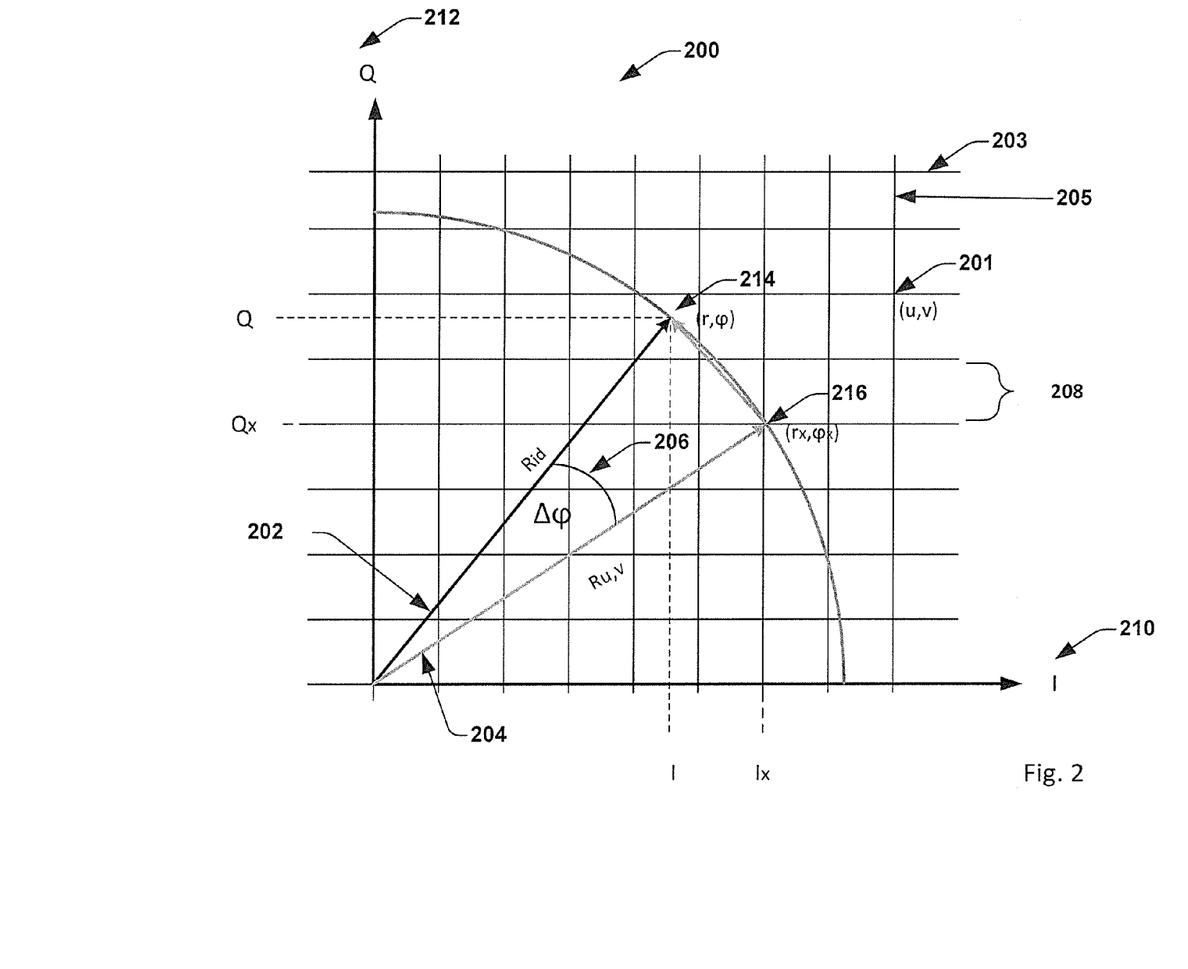
FIG. 2 depicts an I-Q constellation diagram 200, according to one embodiment of the disclosure.

FIG. 2 depicts an I-Q constellation diagram 200, according to one embodiment of the disclosure. The basic idea of this disclosure can be illustrated based on the I-Q constellation diagram 200 with reference to FIG. 1. The I-Q constellation diagram 200 comprises a predefined set of constellation points (u,v) 201, visualized by the intersections of the horizontal grid lines 203 and the vertical grid lines 205. The location of the predefined set of constellation points (u,v) 201 are determined based on a resolution of a DAC, for example the DAC in the modulation circuit 104 in FIG. 1. The discrete set of constellation points (u,v) 201 represent the values that can be obtained due to the quantization of the DAC in the two-dimensional space 200 (i.e., the co-domain or value-range of the DAC). The first I-Q data pair (I,Q) in FIG. 1, defines a first phasor I+jQ, represented as a desired phasor Rid 202 having a radius r and a phase angle ϕ in polar co-ordinate form. Due to the finite quantization of DACs, phasors can be generated only from the predefined set of constellation points (u,v) 201. Therefore, with the conventional approach, the desired phasor Rid 202 cannot be reached precisely, but only with an error of half a quantization step 208 for I coordinate 210 and Q coordinate 212 respectively. In conventional approach, the desired phasor Rid 202 is typically reached by applying a rounding operation on the input data, for example, the first I-Q data pair (I,Q) in FIG. 1.

In this embodiment, instead of applying the rounding operation, a second phasor, for example, a new phasor $R_{u,v}$ 204 corresponding to the second I-Q data pair $(I_x, Q_x)$ in FIG. 1 for example, $I_x + jQ_x$ is chosen by selecting a constellation point from the predefined set of constellation points (u,v) 201 based on a design criteria. The new phasor $R_{u,v}$ 204 has a radius $r_x$ and a phase angle $\phi_x$ associated therewith in polar co-ordinate form. The design criteria for choosing the new phasor $R_{u,v}$ 204 relies on the polar representation of the desired phasor Rid 202 and the new phasor $R_{u,v}$ 204.

In some embodiments, the design criteria comprises choosing a second phasor, for example, the new phasor $R_{u,v}$ 204 which minimizes the squared difference between the radius of the desired phasor Rid 202 and the chosen phasor $R_{u,v}$ 204.

$$\operatorname*{argmin}_{I_x \in u, Q_x \in v} = (r_x - r)^2 \qquad (1)$$

In other embodiments, the design criteria comprises choosing a phasor, for example, the new phasor $R_{u,v}$ 204 which minimizes the absolute error between the radius of the desired phasor Rid 202 and the chosen phasor $R_{u,v}$ 204.

$$\operatorname*{argmin}_{I_x \in u, Q_x \in v} = |r_x - r| \qquad (2)$$

Alternately, other design criterions that yield a minimum value can also be chosen. The instructions to implement the design criteria can be stored in the memory circuit 103 of FIG. 1.

The new phasor $R_{u,v}$ 204 exhibits a phase difference Δϕ 206 with respect to the desired phasor Rid 202, given by $$\Delta\phi = \phi - \phi_x \qquad (3)$$

wherein ϕ is the phase angle of the desired phasor Rid 202 and $\phi_x$ is the phase angle of the new phasor $R_{u,v}$ 204. This phase difference needs to be compensated in order to get a transmit signal, for example, the compensated output signal 116 in FIG. 1, corresponding to the desired phasor Rid 202. In some embodiments, the phase difference Δϕ 206 corresponds to the residual angle Δϕ 114 in FIG. 1 which is compensated in the modulation circuit 104.

Figure 3:
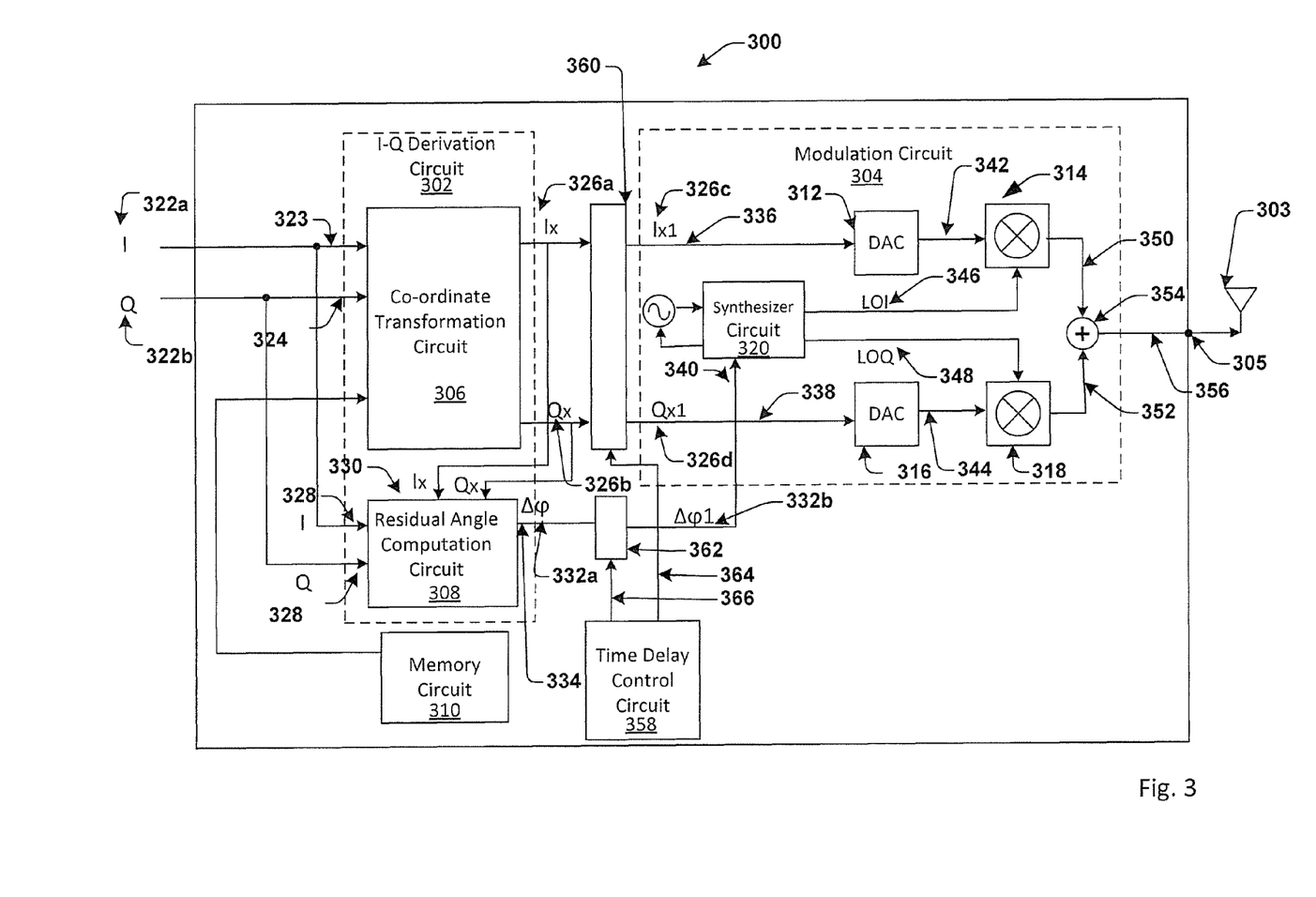
FIG. 3 depicts an example implementation of a hybrid polar I-Q transmitter 300, according to one embodiment of the disclosure.

FIG. 3 depicts an example implementation of a hybrid polar I-Q transmitter 300, according to one embodiment of the disclosure. The hybrid polar I-Q transmitter 300 comprises an I-Q derivation circuit 302, a modulation circuit 304 and an antenna port 305. In some embodiments, the modulation circuit 104 can be a part of radio frequency (RF) front end of the hybrid polar I-Q transmitter 300. The I-Q derivation circuit 302 comprises a co-ordinate transformation circuit 306 and a residual angle computation circuit 308. The co-ordinate transformation circuit 306 is configured to receive a first I-Q data component I 322a at a first input 323 and a second I-Q data component Q 322b at a second input 324, corresponding to the desired phasor Rid 202 in FIG. 2 and generate a first I-Q derived data component Ix 326a and a second I-Q derived data component Qx 326b, corresponding to the new phasor $R_{u,v}$ 204 in FIG. 2, based thereon. Generation of the first I-Q derived data component Ix 326a and the second I-Q derived data component Qx 326b is performed by choosing a constellation point from a predefined set of constellation points based on a design criteria, as explained above with respect to FIG. 2. In some embodiments, the hybrid polar I-Q transmitter comprises a memory circuit 310 configured to store the instructions required to implement the design criteria. In some implementations, the memory circuit 310 comprises digital logic to implement the instructions, memory, firmware etc. The memory circuit 310 is coupled to the I-Q derivation circuit 302 and in some implementations, the memory circuit 310 could be a part of the I-Q derivation circuit 302.

The residual angle computation circuit 308 is configured to receive the first I-Q data component I 322a and the second I-Q data component Q 322b at a first input 328 and receive the first I-Q derived data component Ix 326a and the second I-Q derived data component Qx 326b at a second input 330 and generate a residual angle Δϕ 332a at an output 334 thereof. In some embodiments, the residual angle Δϕ 332a is generated by computing a difference between a phase angle associated with the first I-Q data component I 322a and the second I-Q data component Q 322b, for example the phase angle ϕ of the desired phasor Rid 202 in FIG. 2 and a phase angle associated with the first I-Q derived data component $I_x$ 326a and the second I-Q derived data component $Q_x$ 326b, for example the phase angle $\phi_x$ of the new phasor $R_{u,v}$ 204 in FIG. 2. In some embodiments, the residual angle Δϕ 332a corresponds to the residual angle Δϕ 206 of FIG. 2.

The hybrid polar I-Q transmitter 300 further comprises a first signal path 336, a second signal path 338 and a residual angle path 340 configured to convey the first I-Q derived data component Ix 326a, the second I-Q derived data component Qx 326b and the residual angle Δϕ 332a respectively to the modulation circuit 304. The modulation circuit 304 is configured to up convert the first I-Q derived data component Ix 326a and the second I-Q derived data component Qx 326b based on phase compensated local oscillator (LO) signals. The phase compensated LO signals comprises LO signals having a correction phase added thereto, corresponding to the residual angle Δϕ 332a. In some embodiments, the modulation circuit 304 comprises a synthesizer circuit 320 configured to generate the phase compensated LO signals, using the residual angle Δϕ 332a.

The hybrid polar I-Q transmitter 300, in some embodiments, further comprises a time delay control circuit 358 configured to maintain precision timing alignment between signals in the residual angle path 340 and the first and the second signal paths 336 and 338 respectively. In some embodiments, the time delay control circuit 358 is configured to compensate a time delay between the propagation of the residual angle Δϕ 332a in the residual angle path 340, and the propagation of the first I-Q derived data component $I_x$ 326a in the first signal path 336 and the propagation of the second I-Q derived data component $Q_x$ 326b in the second signal path 338 respectively. Propagation and processing delays between amplitude and phase paths is a common issue in polar transmitters and could be attributed to pipeline differences in the paths, asymmetry of processing etc. The time delay control circuit 358 is configured to generate control signals 366 and 364 to compensate the time delay between signals in the residual angle path 340 and the first and the second signal paths 336 and 338 respectively. In some embodiments, the time delay control circuit 358 is configured to generate the control signals 366 and 364 based on a predetermined setting of a time delay parameter. However, in other embodiments, the control signals 364 and 366 can be generated based on other parameters, for example, parameters determined based on some inputs.

Further, the hybrid polar I-Q transmitter 300 comprises a first delay circuit 360 configured to apply a first delay to the first I-Q derived data component Ix 326a and the second I-Q derived data component Qx 326b, based on the control signal 366 and thereby generate a first delayed I-Q derived data component Ix1 326c and the second delayed I-Q derived data component Qx1 326d. In addition, the hybrid polar I-Q transmitter 300 comprises a second delay circuit 362 configured to apply a second delay to the residual angle Δϕ 332a, based on the control signal 364 and thereby generate a delayed residual angle Δϕ1 332b. Further, in some embodiments, a first delay circuit 360 and the second delay circuit 362 may not apply any time delay to the first I-Q derived data component Ix 326a and the second I-Q derived data component Qx 326b, and the residual angle Δϕ 332a, respectively and thereby bypassing signals in the residual angle path 340 and the first and the second signal paths 336 and 338. Thus, in such embodiments, the first I-Q derived data component Ix 326a and the first delayed I-Q derived data component Ix1 326c are the same, and the second I-Q derived data component Qx 326b and the second delayed I-Q derived data component Qx1 326d are the same. Similarly, in such embodiments, the residual angle Δϕ 332a and delayed residual angle Δϕ1 332b are the same. Further, in some embodiments, the second delay circuit 362 may not apply any time delay to the residual angle Δϕ 332a since Δϕ 332a is delayed through some processing inside the synthesizer 320. In this case, the first delay circuit 360 is configured such that the I-Q data Ix 326a and Qx 326b are delayed accordingly taking the processing delay of Δϕ 332a into account.

The modulation circuit 304 is located downstream of the first delay circuit 360 and the second delay circuit 362, and comprises a first DAC 312, a first mixer circuit 314, a second DAC 316, a second mixer circuit 318 and the synthesizer circuit 320. The first DAC 312 is located downstream of the first signal path 336 and is configured to convert the first delayed I-Q derived data component $I_{x1}$ 326c to an analog I signal 342. The first mixer circuit 314 is located downstream of the first DAC 312 and is configured to up convert the analog I signal 342 to a first RF output signal 350 based on a first local oscillator (LO) signal LOI 346. Similarly, the second DAC 316 is located downstream of the second signal path 338 and is configured to convert the second delayed I-Q derived data component $Q_{x1}$ 326d to an analog Q signal 344. The second mixer circuit 318 is located downstream of the second DAC 316 and is configured to up convert the analog Q signal 344 to a second RF output signal 352 based on a second LO signal LOQ 348. In some embodiments, the first DAC 312 and the first mixer circuit 314 are combined to form a first RFDAC and the second DAC 316 and the second mixer circuit 318 are combined to form a second RFDAC. A resolution information of the first DAC 312 and the second DAC 316 are utilized to generate the predefined set of constellation points in the constellation diagram, as explained above with respect to FIG. 2.

The synthesizer circuit 320 is configured to generate the LO signals LOI 346 and LOQ 348. In some embodiments, the synthesizer circuit 320 is configured to receive the delayed residual angle Δϕ1 332b from the residual angle computation circuit 308 via the residual angle path 340 and generate a phase compensated local oscillator (LO) signal comprising the first signal LOI 346 and the second LO signal LOQ 348 based thereon, with a correction phase added thereto, wherein the correction phase corresponds to the residual angle Δϕ 332a. The first signal LOI 346 and the second LO signal LOQ 348 are phase shifted from one another by 90°. In some embodiments, time delay to the residual angle Δϕ 332a could be applied within the synthesizer unit 320, rather than in the second delay circuit 362, as explained above. In some embodiments, the synthesizer circuit 320 comprises an LO generation circuit with phase/frequency modulation capability. In some implementations, the synthesizer circuit 320 is realized using a digital phase locked loop (DPLL) with two point modulation. In some implementations, the synthesizer 320 with phase/frequency modulation capability is realized by using a digital-to-time converter (DTC). The modulation circuit 304 further comprises a summation circuit 354 configured to receive the first RF output signal 350 and the second RF output signal 352, and generate a compensated RF output signal 356 based thereon. The compensated RF output signal is then transmitted to the antenna 303 via the antenna port 305.

Figure 4:
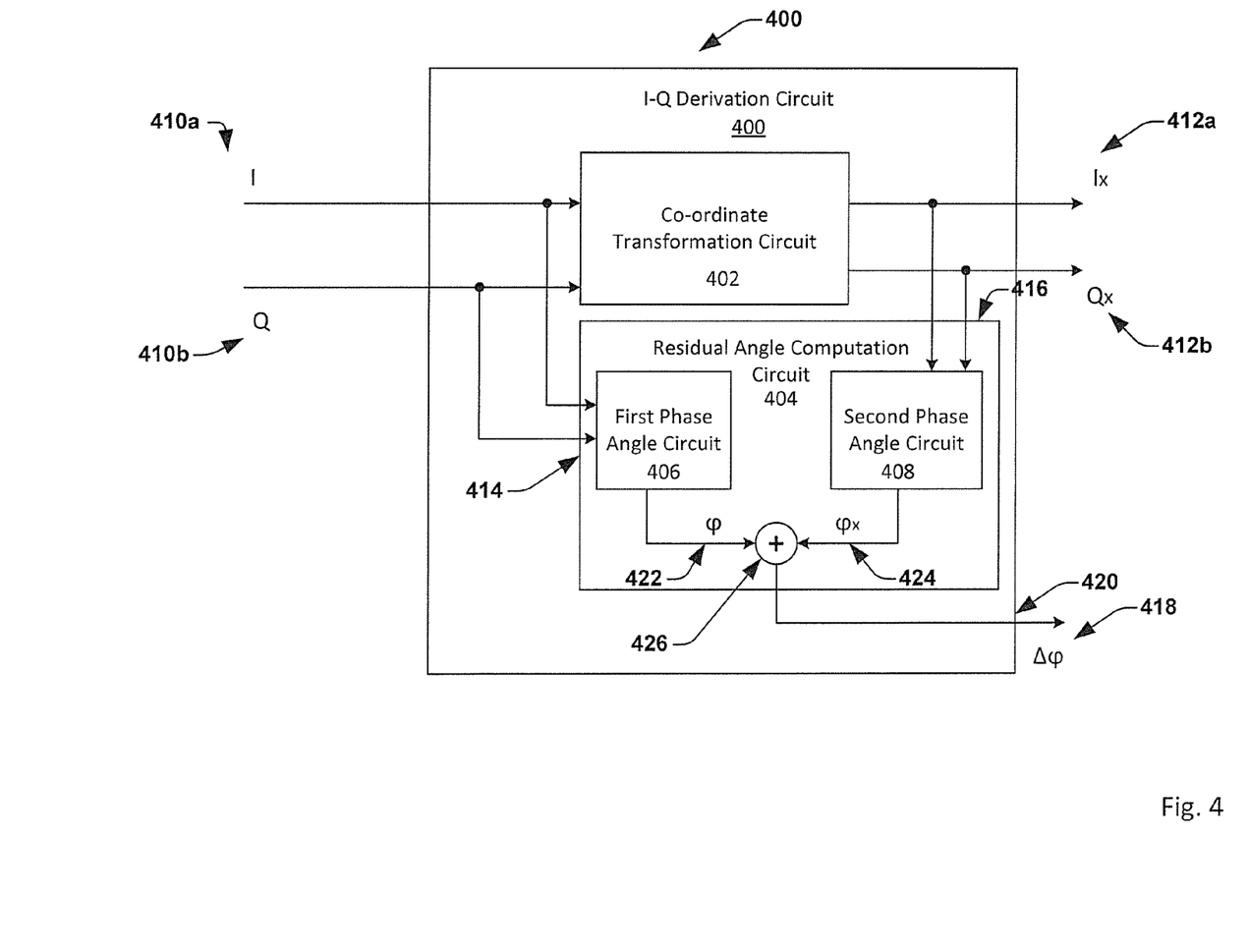
FIG. 4 depicts an example implementation of an I-Q derivation circuit 400, according to one embodiment of the disclosure.

FIG. 4 depicts an example implementation of an I-Q derivation circuit 400, according to one embodiment of the disclosure. The I-Q derivation circuit 400 comprises a co-ordinate transformation circuit 402 and a residual angle computation circuit 404. The co-ordinate transformation circuit 402 is configured to receive a first I-Q data component I 410a and a second I-Q data component Q 410b, and generate a first I-Q derived data component Ix 412a and a second I-Q derived data component Qx 412b, as explained above with respect to FIG. 3. The residual angle computation circuit 404 is configured to receive the first I-Q data component I 410a and the second I-Q data component Q 410b at a first input 414 and receive the first I-Q derived data component Ix 412a and the second I-Q derived data component Qx 412b at a second input 416 and generate a residual angle Δϕ 418 at an output 420 thereof. In some embodiments, the residual angle computation circuit 404 comprises a first phase angle circuit 406 configured to determine a phase angle ϕ 422 associated with the first I-Q data component I 410a and the second I-Q data component Q 410b. Further, the residual angle computation circuit 404 comprises a second phase angle circuit 408 configured to determine a phase angle ϕx 424 associated with receive the first I-Q derived data component Ix 412a and the second I-Q derived data component Qx 412b. In addition the residual angle computation circuit 404 comprises a phase angle difference circuit 426 configured to receive the phase angle ϕ 422 and the phase angle ϕx 424 and generate the residual angle Δϕ 418 based thereon. In some embodiments, the residual angle Δϕ 418 is generated by computing a difference between the phase angle ϕ 422 and the phase angle ϕx 424 at the phase angle difference circuit 426.

Figure 5:
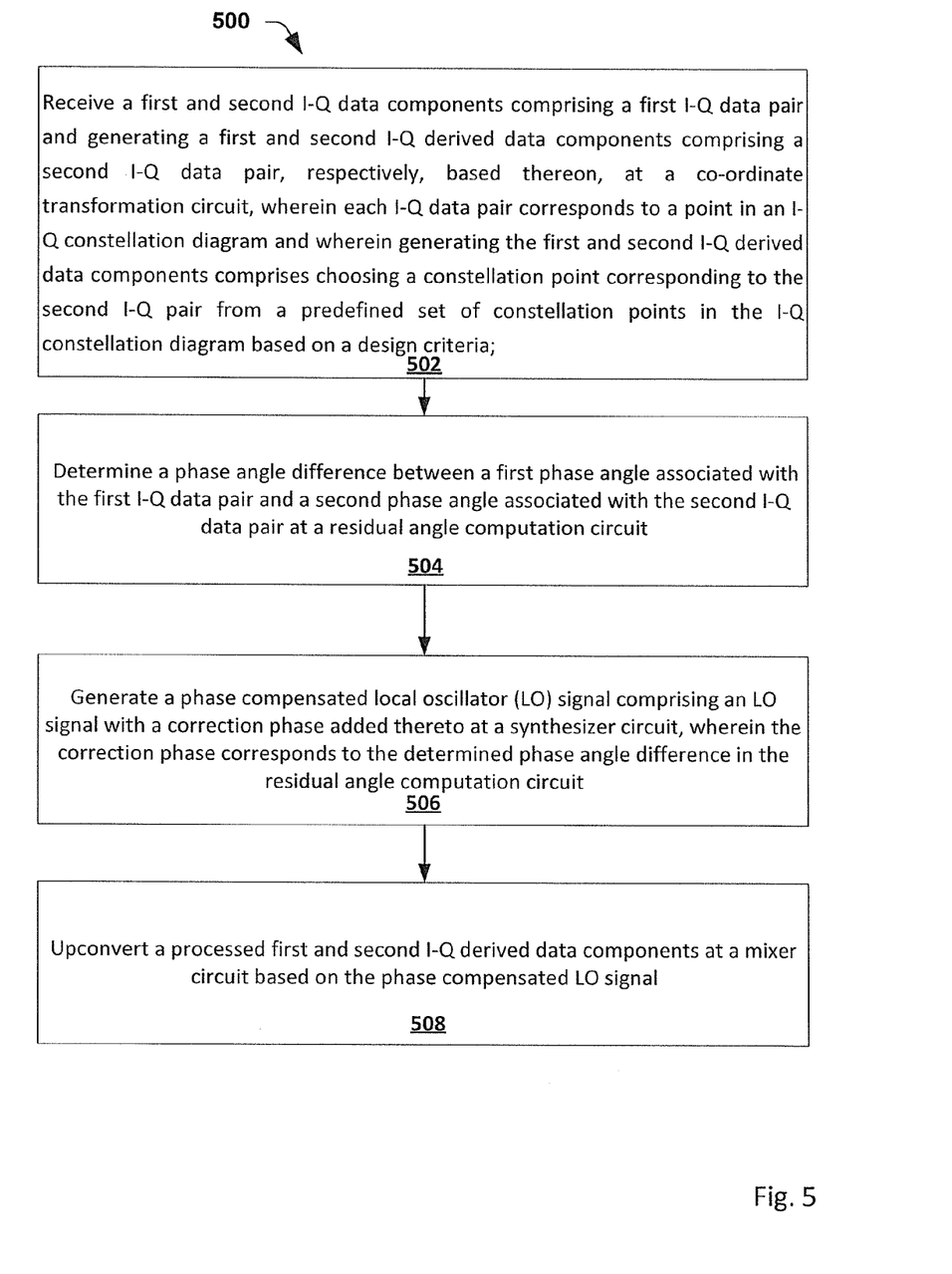
FIG. 5 shows a flowchart of a method 500 for a hybrid polar I-Q transmitter, according to one embodiment of the disclosure.

FIG. 5 shows a flowchart of a method 500 for a hybrid polar I-Q transmitter, according to one embodiment of the disclosure. The method 500 is described herein with respect to the hybrid polar I-Q transmitter 300 of FIG. 3 and the constellation diagram 200 of FIG. 2. At 502, a first I-Q data component I 322a and a second I-Q data component Q 322b comprising a first I-Q data pair is received at an input of the co-ordinate transformation circuit 306 and a first I-Q derived data component Ix 326a and a second I-Q derived data component Qx 326b comprising a second I-Q data pair is generated based thereon. Generating the first I-Q derived data component Ix 326a and the second I-Q derived data component Qx 326b comprises choosing a constellation point 216 corresponding to the second I-Q pair from a predefined set of constellation points in the I-Q constellation diagram 200 based on a design criteria. At 504, a phase angle difference between a first phase angle associated with the first I-Q data pair, for example the phase angle ϕ of the desired phasor Rid 202 in FIG. 2 and a second phase angle associated with the second I-Q data pair, for example the phase angle ϕ$_x$ of the new phasor R$_{u,v}$ 204 in FIG. 2, is determined at the residual angle computation circuit 308. At 506, a phase compensated local oscillator (LO) signal comprising LO signals LOI 346 and LOQ 348 with a correction phase added thereto are generated at the synthesizer circuit 320, wherein the correction phase corresponds to the determined phase angle difference, for example the residual angle Δϕ 332a in the residual angle computation circuit 308. At 508, a processed first and second I-Q derived data components, for example, the analog I signal 342 and the analog Q signal 344 are phase compensated and up converted at a mixer circuit, for example the first mixer circuit 314 and the second mixer circuit 318 of FIG. 3, based on the phase compensated LO signal. In some embodiments, this method enables hybrid polar I-Q transmitters to achieve low noise floors using lower resolution DACs.

While the methods are illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a hybrid polar I-Q transmitter, comprising: an I-Q derivation circuit configured to receive first and second I-Q data component comprising a first I-Q data pair, generate first and second I-Q derived data component comprising a second I-Q data pair, respectively, based thereon, by utilizing a resolution information of a digital-to-analog converter (DAC) in a signal path of the first and second I-Q derived data components and a design criteria, and wherein the I-Q derivation circuit is further configured to determine a residual angle corresponding to a phase angle difference between the first I-Q pair and the second I-Q pair, wherein each of the first and second I-Q data pairs corresponds to a point in an I-Q constellation diagram, and wherein the first I-Q data pair defines a first phasor having a first radius and a first phase angle associated therewith and the second I-Q data pair defines a second phasor having a second radius and a second phase angle associated therewith; and a modulation circuit configured to compensate the determined residual angle corresponding to the phase angle difference between the first I-Q pair and the second I-Q pair in the I-Q derivation circuit.

Example 2 is a hybrid polar I-Q transmitter including the subject matter of example 1, wherein the I-Q derivation circuit comprises a co-ordinate transformation circuit configured to receive the first and second I-Q data components comprising the first I-Q data pair and generate the first and second I-Q derived data components comprising the second I-Q data pair, wherein generating the first and second I-Q derived data components comprises choosing a constellation point corresponding to the second I-Q data pair from a predefined set of constellation points in the I-Q constellation diagram based on the design criteria.

Example 3 is a hybrid polar I-Q transmitter including the subject matter of examples 1-2, including or omitting elements, wherein the predefined set of constellation points in the I-Q constellation diagram is determined based on the resolution information of the DAC.

Example 4 is a hybrid polar I-Q transmitter including the subject matter of examples 1-3, including or omitting elements, wherein the design criteria comprises choosing the second I-Q data pair which minimizes a squared difference between the first radius of the first phasor and the second radius of the second phasor.

Example 5 is a hybrid polar I-Q transmitter including the subject matter of examples 1-4, including or omitting elements, wherein the design criteria comprises choosing the second I-Q data pair which minimizes an absolute error between the first radius of the first phasor and the second radius of the second phasor.

Example 6 is a hybrid polar I-Q transmitter including the subject matter of examples 1-5, including or omitting elements, wherein the I-Q derivation circuit further comprises a residual angle computation circuit configured to receive the first and second I-Q data components at a first input and the first and second I-Q derived data components from an output of the computation circuit at a second input, and determine the phase angle difference associated there between.

Example 7 is a hybrid polar I-Q transmitter including the subject matter of examples 1-6, including or omitting elements, wherein the residual angle computation circuit further comprises a first phase angle circuit configured to determine the first phase angle associated with the first and second I-Q data components, a second phase angle circuit configured to determine the second phase angle associated with the first and second I-Q derived data components and a phase difference circuit configured to determine a difference between the first phase angle and the second phase angle.

Example 8 is a hybrid polar I-Q transmitter including the subject matter of examples 1-7, including or omitting elements, further comprising a memory circuit configured to store instructions to implement the design criteria.

Example 9 is a hybrid polar I-Q transmitter including the subject matter of examples 1-8, including or omitting elements, further comprising a first signal path, a second signal path and a residual angle path configured to convey the first I-Q derived data component, the second I-Q derived data component and the residual angle respectively, to the modulation circuit.

Example 10 is a hybrid polar I-Q transmitter including the subject matter of examples 1-9, including or omitting elements, further comprising a time delay control circuit configured to compensate a time delay between a propagation of the residual angle in the residual angle path, and a propagation of the first I-Q derived data component in the first signal path and a propagation of the second I-Q derived data component in the second signal path respectively.

Example 11 is a hybrid polar I-Q transmitter including the subject matter of examples 1-10, including or omitting elements, wherein the modulation circuit comprises a synthesizer circuit configured to receive the residual angle from the residual angle path and generate a phase compensated local oscillator (LO) signal comprising an LO signal with a correction phase added thereto, wherein the correction phase corresponds to the residual angle.

Example 12 is a hybrid polar I-Q transmitter including the subject matter of examples 1-11, including or omitting elements, wherein the synthesizer circuit comprises a digital-to-time converter.

Example 13 is a hybrid polar I-Q transmitter including the subject matter of examples 1-12, including or omitting elements, wherein the phase compensated LO signal further comprises a first LO signal and a second LO signal which are phase shifted from one another by 90°.

Example 14 is a hybrid polar I-Q transmitter including the subject matter of examples 1-13, including or omitting elements, wherein the modulation circuit further comprises the DAC, the resolution information of which is used in the I-Q derivation circuit to generate the first and second I-Q derived data components, wherein the DAC comprises a first DAC component located downstream of the first signal path and configured to receive and process the first I-Q derived data component, and a second DAC component located downstream of the second signal path and configured to receive and process the second I-Q derived data component.

Example 15 is a hybrid polar I-Q transmitter including the subject matter of examples 1-14, including or omitting elements, wherein the modulation circuit further comprises a first mixer circuit configured to up convert the processed first I-Q derived data component from the first DAC component based on the first LO signal and a second mixer circuit configured to up convert the processed second I-Q derived data component from the second DAC component based on the second LO signal.

Example 16 is a hybrid polar I-Q transmitter, comprising: a co-ordinate transformation circuit configured to receive first and second I-Q data components comprising a first I-Q data pair and generate first and second I-Q derived data components comprising a second I-Q data pair, respectively, based thereon, wherein each of the first and the second I-Q data pairs corresponds to a point in an I-Q constellation diagram and wherein the co-ordinate transformation circuit is configured to generate the first and second I-Q derived data components by choosing a constellation point corresponding to the second I-Q pair from a predefined set of constellation points in the I-Q constellation diagram based on a design criteria, and wherein the first I-Q data pair defines a first phasor having a first radius and a first phase angle associated therewith and the second I-Q data pair defines a second phasor having a second radius and a second phase angle associated therewith; a residual angle computation circuit configured to determine a phase angle difference between the first phasor and the second phasor; and a synthesizer circuit configured to compensate the first and second I-Q derived data components using the determined phase angle difference by generating a phase compensated local oscillator (LO) signal comprising an LO signal with a correction phase added thereto, wherein the correction phase corresponds to the determined phase angle difference in the residual angle computation circuit.

Example 17 is a hybrid polar I-Q transmitter including the subject matter of example 16, further comprising a digital-to-analog converter (DAC), a resolution information of which is used in determining the predefined set of constellation points in the I-Q constellation diagram and is configured to receive and process the first and second I-Q derived data components.

Example 18 is a hybrid polar I-Q transmitter including the subject matter of examples 16-17, including or omitting elements, wherein the design criteria comprises choosing the second I-Q data pair that minimizes a squared difference between the first radius of the first phasor and the second radius of the second phasor.

Example 19 is a hybrid polar I-Q transmitter including the subject matter of examples 16-18, including or omitting elements, wherein the design criteria comprises choosing the second I-Q data pair which minimizes an absolute error between the first radius of the first phasor and the second radius of the second phasor.

Example 20 is a method for a hybrid polar I-Q transmitter, comprising: receiving first and second I-Q data components comprising a first I-Q data pair and generating first and second I-Q derived data components comprising a second I-Q data pair, respectively, based thereon, using a co-ordinate transformation circuit, wherein each I-Q data pair corresponds to a point in an I-Q constellation diagram and wherein generating the first and second I-Q derived data components comprises choosing a constellation point corresponding to the second I-Q pair from a predefined set of constellation points in the I-Q constellation diagram based on a design criteria; determining a phase angle difference between a first phase angle associated with the first I-Q data pair and a second phase angle associated with the second I-Q data pair using a residual angle computation circuit; generating a phase compensated local oscillator (LO) signal comprising an LO signal with a correction phase added thereto using a synthesizer circuit, wherein the correction phase corresponds to the determined phase angle difference in the residual angle computation circuit; and up converting a processed first and second I-Q derived data components at a mixer circuit based on the phase compensated LO signal.

Example 21 is a method for a hybrid polar I-Q transmitter including the subject matter of examples 20, further comprising processing the first and second I-Q derived data components at a digital to analog converter (DAC) circuit to generate the processed first and second I-Q derived data components prior to up converting the processed first and second I-Q derived data components.

Example 22 is a method for a hybrid polar I-Q transmitter including the subject matter of examples 20-21, including or omitting elements, further comprising determining the predefined set of constellation points in the I-Q constellation diagram based on a resolution information of the DAC.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

The invention claimed is:

1. A hybrid polar in-phase quadrature (I-Q) transmitter, comprising:
an I-Q derivation circuit configured to:
receive first and second I-Q data components comprising a first I-Q data pair,
generate first and second I-Q derived data components comprising a second I-Q data pair, respectively, based on a resolution information of a digital-to-analog converter (DAC) in a signal path of the first and second I-Q derived data components and a design criteria, and
wherein the I-Q derivation circuit is further configured to determine a residual angle corresponding to a phase angle difference between the first I-Q data pair and the second I-Q data pair, wherein each of the first and second I-Q data pairs corresponds to a point in an I-Q constellation diagram, and
wherein the first I-Q data pair defines a first phasor having a first radius and a first phase angle associated therewith and the second I-Q data pair defines a second phasor having a second radius and a second phase angle associated therewith; and
a modulation circuit configured to compensate the determined residual angle corresponding to the phase angle difference between the first I-Q data pair and the second I-Q data pair in the I-Q derivation circuit.

2. The I-Q transmitter of claim 1, wherein the I-Q derivation circuit further comprises a co-ordinate transformation circuit configured to:
receive the first and second I-Q data components comprising the first I-Q data pair and
generate the first and second I-Q derived data components comprising the second I-Q data pair, wherein generating the first and second I-Q derived data components comprises choosing a constellation point corresponding to the second I-Q data pair from a predefined set of constellation points in the I-Q constellation diagram based on the design criteria.

3. The I-Q transmitter of claim 2, wherein the predefined set of constellation points in the I-Q constellation diagram is determined based on the resolution information of the DAC.

4. The I-Q transmitter of claim 2, wherein the design criteria comprises choosing the second I-Q data pair which minimizes a squared difference between the first radius of the first phasor and the second radius of the second phasor.

5. The I-Q transmitter of claim 2, wherein the design criteria comprises choosing the second I-Q data pair which minimizes an absolute error between the first radius of the first phasor and the second radius of the second phasor.

6. The I-Q transmitter of claim 2, wherein the I-Q derivation circuit further comprises a residual angle computation circuit configured to receive the first and second I-Q data components at a first input and the first and second I-Q derived data components from an output of the computation circuit at a second input, and determine the phase angle difference associated there between.

7. The I-Q transmitter of claim 6, wherein the residual angle computation circuit further comprises:
a first phase angle circuit configured to determine the first phase angle associated with the first and second I-Q data components,
a second phase angle circuit configured to determine the second phase angle associated with the first and second I-Q derived data components, and
a phase difference circuit configured to determine a difference between the first phase angle and the second phase angle.

8. The I-Q transmitter of claim 1, further comprising a memory circuit configured to store instructions to implement the design criteria.

9. The I-Q transmitter of claim 1, further comprising a first signal path, a second signal path and a residual angle path configured to convey the first I-Q derived data component, the second I-Q derived data component and the residual angle respectively, to the modulation circuit.

10. The I-Q transmitter of claim 9, further comprising a time delay control circuit configured to compensate a time delay between a propagation of the residual angle in the residual angle path, and a propagation of the first I-Q derived data component in the first signal path and a propagation of the second I-Q derived data component in the second signal path respectively.

11. The I-Q transmitter of claim 9, wherein the modulation circuit comprises a synthesizer circuit configured to receive the residual angle from the residual angle path and generate a phase compensated local oscillator (LO) signal comprising an LO signal with a correction phase added thereto, wherein the correction phase corresponds to the residual angle.

12. The I-Q transmitter of claim 11, wherein the synthesizer circuit comprises a digital-to-time converter.

13. The I-Q transmitter of claim 11, wherein the phase compensated LO signal further comprises a first LO signal and a second LO signal which are phase shifted from one another by about 90°.

14. The I-Q transmitter of claim 13, wherein the modulation circuit further comprises:
the DAC, the resolution information of which is used in the I-Q derivation circuit to generate the first and second I-Q derived data components,
wherein the DAC comprises a first DAC component located downstream of the first signal path and configured to receive and process the first I-Q derived data component, and a second DAC component located downstream of the second signal path and configured to receive and process the second I-Q derived data component.

15. The I-Q transmitter of claim 14, wherein the modulation circuit further comprises: a first mixer circuit configured to up convert the processed first I-Q derived data component from the first DAC component based on the first LO signal, and
a second mixer circuit configured to up convert the processed second I-Q derived data component from the second DAC component based on the second LO signal.

16. A hybrid polar in-phase quadrature (I-Q) transmitter, comprising:
a co-ordinate transformation circuit configured to receive first and second I-Q data components comprising a first I-Q data pair and generate first and second I-Q derived data components comprising a second I-Q data pair, respectively, based thereon,
wherein each of the first and the second I-Q data pairs corresponds to a point in an I-Q constellation diagram and wherein the co-ordinate transformation circuit is configured to generate the first and second I-Q derived data components by choosing a constellation point corresponding to the second I-Q data pair from a predefined set of constellation points in the I-Q constellation diagram based on a design criteria, and
wherein the first I-Q data pair defines a first phasor having a first radius and a first phase angle associated therewith and the second I-Q data pair defines a second phasor having a second radius and a second phase angle associated therewith;
a residual angle computation circuit configured to determine a phase angle difference between the first phasor and the second phasor; and
a synthesizer circuit configured to compensate the first and second I-Q derived data components using the determined phase angle difference by generating a phase compensated local oscillator (LO) signal comprising an LO signal with a correction phase added thereto, wherein the correction phase corresponds to the determined phase angle difference in the residual angle computation circuit.

17. The I-Q transmitter of claim 16, further comprising a digital-to-analog converter (DAC), a resolution information of which is used in determining the predefined set of constellation points in the I-Q constellation diagram and is configured to receive and process the first and second I-Q derived data components.

18. The I-Q transmitter of claim 16, wherein the design criteria comprises choosing the second I-Q data pair that minimizes a squared difference between the first radius of the first phasor and the second radius of the second phasor.

19. The I-Q transmitter of claim 16, wherein the design criteria comprises choosing the second I-Q data pair which minimizes an absolute error between the first radius of the first phasor and the second radius of the second phasor.

20. A method for a hybrid polar in-phase quadrature (I-Q) transmitter, comprising:
receiving first and second I-Q data components comprising a first I-Q data pair and generating first and second I-Q derived data components comprising a second I-Q data pair, respectively, based thereon, using a co-ordinate transformation circuit,
wherein each of the first and the second I-Q data pairs corresponds to a point in an I-Q constellation diagram and wherein generating the first and second I-Q derived data components comprises choosing a constellation point corresponding to the second I-Q data pair from a predefined set of constellation points in the I-Q constellation diagram based on a design criteria;
determining a phase angle difference between a first phase angle associated with the first I-Q data pair and a second phase angle associated with the second I-Q data pair using a residual angle computation circuit; and
generating a phase compensated local oscillator (LO) signal comprising an LO signal with a correction phase added thereto using a synthesizer circuit, wherein the correction phase corresponds to the determined phase angle difference in the residual angle computation circuit; and
upconverting a processed first and second I-Q derived data components at a mixer circuit based on the phase compensated LO signal.

21. The method of claim 20, further comprising processing the first and second I-Q derived data components at a digital to analog converter (DAC) circuit to generate the processed first and second I-Q derived data components prior to up converting the processed first and second I-Q derived data components.

22. The method of claim 21, further comprising determining the predefined set of constellation points in the I-Q constellation diagram based on a resolution information of the DAC.

* * * * *